United States Patent
Karlsson et al.

(10) Patent No.: US 10,378,153 B2
(45) Date of Patent: Aug. 13, 2019

(54) METHOD FOR HYDROPHOBING A CELLULOSE SUBSTRATE

(71) Applicant: Stora Enso OYJ, Helsinki (FI)

(72) Inventors: Annki Karlsson, Karlstad (SE); Raija Badenlid, Karlstad (SE); Stig Tollnerius, Karlstad (SE); Susanne Hansson, Vendelso (SE)

(73) Assignee: STORA ENSO OYJ, Helsinki (FI)

( * ) Notice: Subject to any disclaimer, the term of this patent is extended or adjusted under 35 U.S.C. 154(b) by 34 days.

(21) Appl. No.: 15/580,560

(22) PCT Filed: Jun. 28, 2016

(86) PCT No.: PCT/IB2016/053843
§ 371 (c)(1),
(2) Date: Dec. 7, 2017

(87) PCT Pub. No.: WO2017/002005
PCT Pub. Date: Jan. 5, 2017

(65) Prior Publication Data
US 2018/0179708 A1    Jun. 28, 2018

Related U.S. Application Data

(60) Provisional application No. 62/186,074, filed on Jun. 29, 2015.

(51) Int. Cl.
*B05D 1/00* (2006.01)
*B05D 3/02* (2006.01)
(Continued)

(52) U.S. Cl.
CPC .............. *D21H 21/16* (2013.01); *C08B 3/10* (2013.01); *D21H 17/11* (2013.01); *D21H 17/14* (2013.01);
(Continued)

(58) Field of Classification Search
CPC ........ D21H 21/16; D21H 17/14; D21H 17/11; D21H 23/22; D21H 23/50; D21H 17/17;
(Continued)

(56) References Cited

U.S. PATENT DOCUMENTS 1,312,682 A * 8/1919 Clapp .................... C08L 89/06
162/151
1,390,276 A * 9/1921 Currier .................... B31F 1/14
162/112
(Continued)

FOREIGN PATENT DOCUMENTS

DE    2802663 A1    7/1979
GB    2400336 A    10/2004
(Continued)

OTHER PUBLICATIONS

International Search Report for PCT/IB2016/053843, dated Sep. 26, 2016.

*Primary Examiner* — Jose A Fortuna
(74) *Attorney, Agent, or Firm* — Greer, Burns & Crain, Ltd.

(57) ABSTRACT

Method for hydrophobing a cellulose substrate (1), which comprising a first side and a second side, which faces away from the first side. The method comprising the steps of drying a cellulose substrate (1) to a dry content above 80%, preferably above 85%, adding a vaporized fatty acid halide, to the first side of the cellulose substrate, and, at the same time perform vacuum sucking at the second side of the cellulose substrate, such that, the vaporized fatty acid penetrates the cellulose substrate (1) in a predetermined direction through the substrate.

10 Claims, 1 Drawing Sheet

(51) Int. Cl.
*B05D 3/04* (2006.01)
*D21H 17/11* (2006.01)
*D21H 17/14* (2006.01)
*D21H 21/16* (2006.01)
*D21H 23/22* (2006.01)
*D21H 23/50* (2006.01)
*C08B 3/10* (2006.01)
*B05D 5/08* (2006.01)

(52) U.S. Cl.
CPC ............. *D21H 23/22* (2013.01); *D21H 23/50* (2013.01); *B05D 1/60* (2013.01); *B05D 3/0227* (2013.01); *B05D 3/0493* (2013.01); *B05D 5/08* (2013.01); *B05D 2203/22* (2013.01); *B05D 2252/02* (2013.01)

(58) Field of Classification Search
CPC .. B05D 1/60; B05D 2203/22; B05D 2252/02; B05D 3/0227; B05D 3/0493; B05D 5/08; C08B 3/10; D06M 13/188
See application file for complete search history.

(56) References Cited

U.S. PATENT DOCUMENTS

| | | | | |
|---|---|---|---|---|
| 2,171,791 | A * | 9/1939 | Kaase | D06M 13/188 |
| | | | | 106/243 |
| 2,297,731 | A * | 10/1942 | Waltmann | D06M 13/425 |
| | | | | 8/127.6 |
| 3,560,334 | A * | 2/1971 | Arledter | D21H 23/28 |
| | | | | 162/164.6 |
| 4,107,426 | A | 8/1978 | Gordon | |
| 5,846,663 | A * | 12/1998 | Brungardt | D21H 17/14 |
| | | | | 428/537.5 |
| 6,342,268 | B1* | 1/2002 | Samain | C03C 17/30 |
| | | | | 106/13 |
| 6,797,116 | B2* | 9/2004 | Capizzi | D21H 21/56 |
| | | | | 118/257 |
| 2003/0000668 | A1* | 1/2003 | Eichhorn | D21H 23/54 |
| | | | | 162/184 |
| 2003/0118848 | A1* | 6/2003 | Liu | D06M 15/643 |
| | | | | 428/447 |
| 2010/0087113 | A1* | 4/2010 | Bindschedler | B32B 5/26 |
| | | | | 442/54 |
| 2014/0238295 | A1 | 8/2014 | Valle et al. | |
| 2016/0157519 | A1* | 6/2016 | Guyard | A24D 1/02 |
| | | | | 131/329 |
| 2017/0241080 | A1* | 8/2017 | Eichholz | D21H 25/02 |
| 2017/0360087 | A1* | 12/2017 | Papakyrillou | A24D 3/10 |
| 2018/0179708 | A1* | 6/2018 | Karlsson | D21H 23/50 |

FOREIGN PATENT DOCUMENTS

| | | | |
|---|---|---|---|
| WO | 0026458 | A1 | 5/2000 |
| WO | 2004109015 | A2 | 12/2004 |
| WO | 2007128867 | A1 | 11/2007 |
| WO | 2013113927 | A1 | 8/2013 |
| WO | WO-2017002005 | A1 * | 1/2017 ............. D21H 23/50 |

* cited by examiner

METHOD FOR HYDROPHOBING A CELLULOSE SUBSTRATE

This application is a U.S. National Stage under 35 U.S.C. § 371 of International Application No. PCT/IB2016/053843, filed Jun. 28, 2016, which claims priority to U.S. Provisional Patent application No. 62/186,074, filed Jun. 29, 2015.

FIELD OF INVENTION

Method for hydrophobing of a cellulose substrate, which comprising a first side and a second side, which faces away from the first side.

BACKGROUND OF THE INVENTION

Problem

There is a need to increase the hydrophobicity of materials with a cellulose substrate in several fields, e.g. in the textile industry and the paper- and paperboard industry.

Paper- and paperboard are usually treated with sizing agents to enhance certain qualities, above all to increase the resistance to penetration of water and other liquids into the paper or paperboard. There are two types of sizing; internal and surface sizing. In internal sizing, chemicals are added to the pulp at the wet end, e.g. ASA or AKD. Common surface sizing agents include e.g. starch or acrylic co-polymers.

U.S. Pat. No. 4,107,426 discloses a method for imparting water-repellent characteristics to a surface of a cellulose substrate. The process comprising the steps of exposing the surface to a vapour phase consisting essentially of aliphatic acid chloride.

A drawback with this method is that mainly the surface of a substrate that becomes hydrophobic and not the interior of the substrate. This causes problem with edge wicking, i.e. penetration of liquid into the edges of substrate.

An object with the present invention is to provide a method that enhances the resistance against edge wicking of a cellulose substrate.

SUMMARY OF THE INVENTION

The inventive method comprising the following steps:
drying the cellulose substrate to a dry content above 80%, preferably above 85%.
adding a vaporized fatty acid halide, to the first side of the cellulose substrate, and, at the same time perform
vacuum sucking at the second side of the cellulose substrate, such that, the vaporized fatty acid penetrates the cellulose substrate in a predetermined direction through the substrate.

FIGURES AND A DETAILED DESCRIPTION OF THE INVENTION

In the following, the invention will be described further with reference to the drawings, wherein.

A cellulose substrate 1 comprising a first side and a second side, which second side faces away from the first side. The cellulose substrate, e.g. a paper- or paperboard web 1, is dried in a drying step. The drying is performed by any conventional drying methods suitable for drying a cellulose substrate. A cellulose substrate of a paper- or paperboard web may for example be dried by drying cylinders. After the drying step, the cellulose substrate 1 has a dry content above 80%, preferably above 85% and most preferred above 90%. The higher dry content, the better will the result of the subsequent hydrophobing be.

The cellulose substrate 1 may thereafter be heated. The heating is preferably performed by IR heating.

The first side of the dried and heated substrate is then treated with a vapourized fatty acid halide, in gas-phase, to hydrophobize the substrate, such that, the substrate becomes hydrophobized. In order to enhance the penetration of the gas through the substrate, the second side of the substrate is subjected to a vacuum suction, simultaneously, during the hydrophobing of the substrate, such that, the gas is transported in a predetermined direction, through the substrate. This enhances the hydrophobing of the substrate, such that, the substrate will be more resistant against in-plane edge penetration.

The fatty acid halide can be any halide that can be vaporized, however palmitoyl chloride, C16 has, in tests, shown to be particularly suitable. During tests a covalent degree of 90% has been achieved, compared to conventional AKD sizing where just a few percentage of covalent binding can be obtained, which results in low retention, which thereby leads to e.g. migration problems, stains and machine stops etc.

Another advantage with the gas-phase reaction, in combination with vacuum suction, is that it is very position specific and hydrophobicity is only achieved where the gas can access the substrate. The reagent will react with the available hydroxyl groups forming HCl gas as a by-product. The reagent is also highly reactive towards water and the reaction requires dry substrates. Nevertheless, there will always be some presence of water whereupon the corresponding, less reactive, fatty acid also will be formed as an unbound molecule. It is therefore difficult to achieve 100% covalent degree. Yet other advantages with the use of gas-phase reaction is that the reaction is faster and less amount of chemical reagents are needed.

Figure 1:
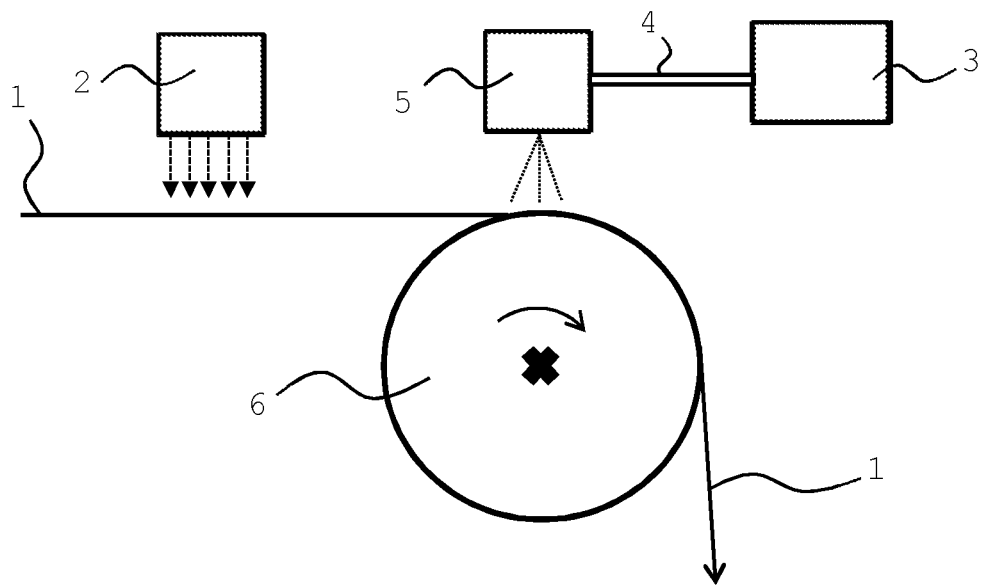
FIG. 1 shows a schematic view of a first embodiment of the invention.
Figure 2:
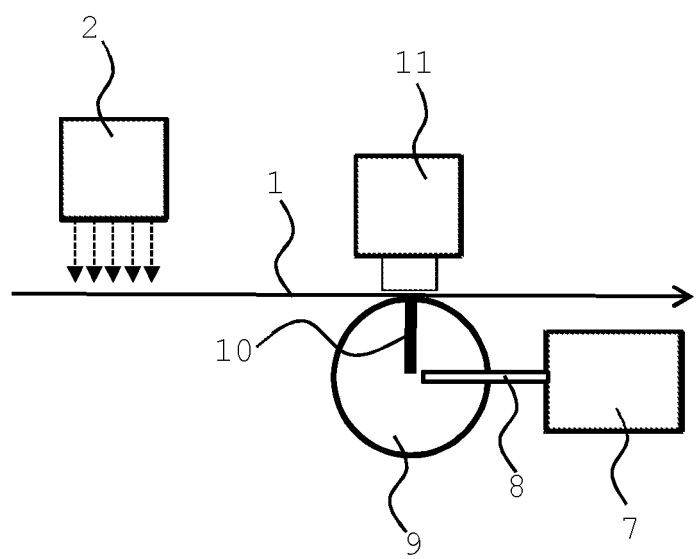
FIG. 2 shows a schematic view of a second embodiment of the invention.

To perform this covalent modification at a larger scale, two different setups are proposed as shown in FIG. 1 and FIG. 2 respectively.

FIG. 1 discloses a first embodiment, in accordance with the invention, where a dried and already heated cellulose substrate 1, in the form of a paper- or paperboard 1, is additionally heated and dried with IR heating from an IR heat box 2. In a separate pressurised tank 3, a liquid fatty acid halide is heated to vaporize the liquid into gas-phase. The gas is thereafter, via a tube 4, transferred to a gas spreading device 5 that sprays the fatty acid halide gas over the first side of the cellulose substrate 1. The second side of the substrate is at the same time in contact with a rotating vacuum cylinder 6, with holes (not shown in figure), that sucks the gas in a predetermined direction through the cellulose substrate 1. Thereby, the cellulose substrate 1 will be hydrophobized through the complete thickness of the substrate. Moreover, the HCl by-product and possibly unreacted palmitoyl chloride and/or unbound C16 can be removed and collected for handling.

FIG. 2 discloses a second embodiment, in accordance with the invention, where a fatty acid halide, in liquid form, is transferred from a tank 7 via a tube 8 to a gas spreading device 9, 10. The gas spreading device 9, 10 comprising a fixed pipe 9 with a thin gap 10. The cellulose substrate 1, in the form of a paper- or paperboard, is transported over the gap 10. The pipe 9, comprising a heating device which heats up the fatty acid halide liquid, such that, the liquid vaporizes to gas-phase. The gap 10 allows the gas to pass through and treat the first side of the cellulose substrate 1. Above the second side of the substrate and the gap is a vacuum box 11 arranged that sucks the gas in a predetermined direction through the cellulose substrate 1. Thereby, the cellulose substrate 1 will be hydrophobized through the complete thickness of the substrate. Moreover, the HCl by-product and possibly unreacted palmitoyl chloride and/or unbound C16 can be removed and collected for handling.

It is believed that the heating step will do that the subsequent hydrophobing gas will penetrate better through the substrate. However, tests have shown that very good results are achieved also with a non-heated cellulose substrate. I.e. the method is applicable on a dried cellulose substrate without heating the cellulose substrate. Hence, the heating step may be excluded from the inventive method and still reach very good results.

In tests we have used hydrophobic contact angle as a measurement of how much the cellulose substrate has been hydrophobized by the method. An un-treated cellulose substrate had before a contact angle of 40° and after treatment of the inventive method a contact angle of 130° on both the first side and the second side of the substrate. Contact angles greater than 90° (high contact angle) generally means that wetting of the surface is unfavourable, so the fluid will minimize contact with the surface and form a compact liquid droplet.

In the foregoing, the invention has been described on the basis of two specific embodiments. It is appreciated, however, that other embodiments and variants are possible within the scope of the following claims. In addition, it is possible to combine the different solutions in FIGS. 1 and 2. The vacuum cylinder 6 in FIG. 1 may be replaced with the vacuum box in FIG. 2.

The gas spreading device 5 in FIG. 1 may be replaced with the gas spreading device 9, 10 in FIG. 2. The vacuum box in FIG. 2 may be replaced with the vacuum cylinder in FIG. 1. The gas spreading device 9, 10 in FIG. 2 may be replaced with the gas spreading device 5 in FIG. 1.

Moreover, a skilled person realises that the IR—heat box, for heating the cellulose substrate, may be replaced with another suitable heating device e.g. a hot cylinder, microwaves or similar.

In addition, the method is particularly effective on paper- or paperboard, however other cellulose substrates are possible such as textiles made from cellulose fibres.

Finally, the gas spreading devices in FIGS. 1 and 2 are only examples how the gas spreading can be made. The skilled person realises that other, not shown, embodiments to spread the fatty acid gas over a first side of a substrate are possible.

The invention claimed is:

1. A method for hydrophobing of a cellulose substrate that comprises a first side and a second side, which faces away from the first side, the method comprising the steps of:
   drying the cellulose substrate to a dry content above 80%
   adding a vaporized fatty acid halide, to the first side of the cellulose substrate, and, at the same time perform,
   vacuum sucking at the second side of the cellulose substrate, such that, the vaporized fatty acid penetrates the cellulose substrate in a predetermined direction through the cellulose substrate.

2. The method according to claim 1, wherein the dry content of the cellulose substrate is above 90%.

3. The method according to claim 1, wherein the fatty acid is palmitoyl chloride, C16.

4. The method according to claim 1, wherein the cellulose substrate is a paper- or paperboard web.

5. The method according to claim 4, wherein the web is a multilayer web.

6. The method according to claim 1, wherein the method further comprising a step of heating the substrate, before adding the vaporized fatty acid.

7. The method according to claim 6, wherein the heating step is performed by IR heating.

8. The method according to claim 1, wherein the vacuum sucking is performed by a vacuum box.

9. The method according to claim 1, wherein the vacuum sucking is performed by a rotating vacuum cylinder.

10. The method according to claim 1, wherein the dying step dries the cellulose substrate to a dry content above 85%.

* * * * *